Feb. 3, 1948. G. E. CHILDS 2,435,268
TAPER THREAD GAGE
Filed Oct. 11, 1944
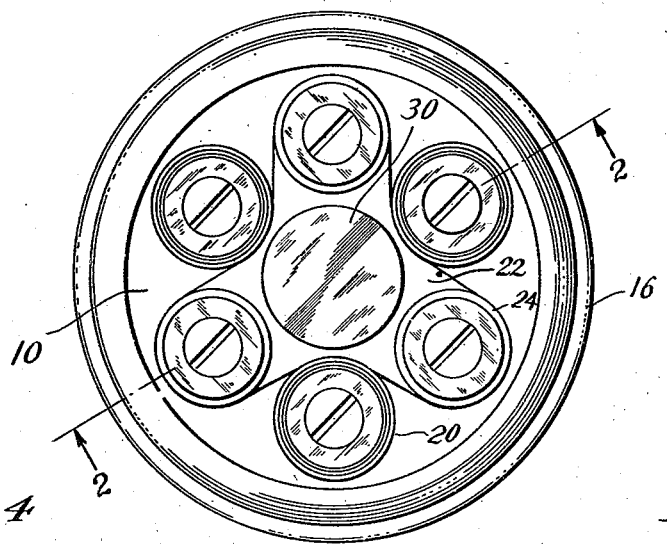
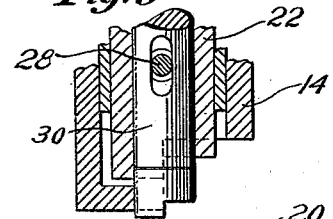
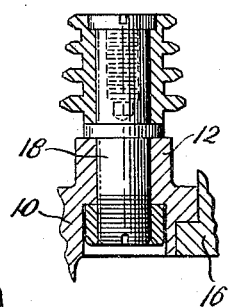
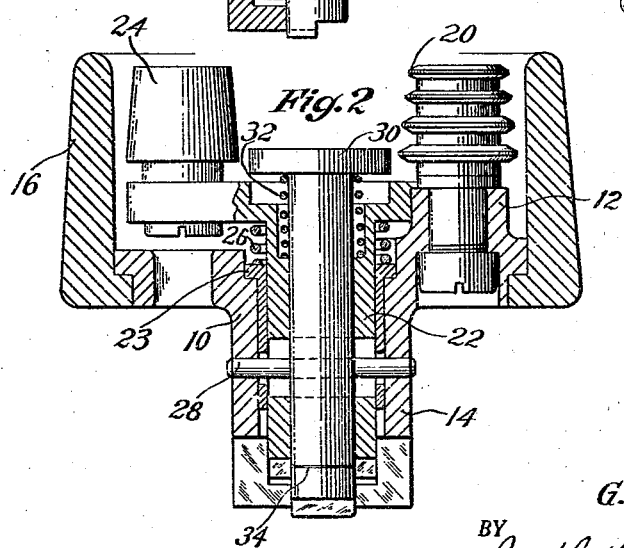
INVENTOR.
G. E. Childs
BY Joseph K. Schofield
ATTORNEY Patented Feb. 3, 1948

2,435,268

UNITED STATES PATENT OFFICE 2,435,268

TAPER THREAD GAGE

Gordon E. Childs, Simsbury, Conn., assignor to Niles-Bement-Pond Company, West Hartford, Conn., a corporation of New Jersey Application October 11, 1944, Serial No. 558,142

5 Claims. (Cl. 33—199)

This invention relates to dimension gages and particularly to a gage for external taper screw threads so designed that in one gaging operation the correctness of the diameter of the threaded surfaces and that of the truncated surfaces at their crests can be obtained simultaneously.

An object of the present invention is to provide an extremely accurate gage for external taper screw threads which will simultaneously indicate variations from standard dimensions of the diameter of the threaded portions of the screw threads and the amount of truncation at the crests of the threads.

A feature that enables the above object to be accomplished is that a gage of the standard "Tri-Roll" type is used with which is associated a plurality of plain conical rollers, the conical surfaces of which are adapted simultaneously to engage the outside diameters of the threads when the gage is in its gaging position.

Another feature is that these plain conical rollers are mounted upon a member movable axially of the work piece being gaged and are disposed at equal distances from this axis.

Also the gage includes an abutment member engaging the end wall of the threaded member being tested, this abutment member being also mounted for movement axially of the work piece during the gaging operation.

And finally it is an object of importance of the invention to provide simultaneously readable indicia on the members carrying the plain conical rolls and the abutment member to determine the position of these members relative to the body member of the gage and to each other so that the gaging of the screw threads may be completed by a single operation.

In gaging screw threads it is difficult to separately gage each element of the threads that may be inaccurate; that is, the lead of the screw threads, their diameter and conformation, and the amount of truncation at their crests may each be inaccurate in various amounts. The inaccuracies of each element may be quite independent of inaccuracies of the other elements. This is particularly true of taper screw threads, such as pipe threads, for the reason that there are still other variables, the longitudinal taper of the screw threads, the taper of the crests, and the amount of truncation at the crests may also vary from the established standards. The present gage, therefore, provides a means of gaging taper screw threads, such as the standard forms of pipe threads, to simultaneously determine the diameter of the threaded portions of the member, the correctness of their taper and the amount of truncation at their crests.

In effect the present gage combines in one operation the gaging operations on external taper screw threads accomplished by successively using the gages shown in the patents to C. G. Johnson 1,908,253, granted May 9, 1933, and S. G. Johnson 2,218,111, granted October 15, 1940.

With the above and other objects in view, the invention includes the features of construction and operation set forth in the following specification and illustrated in the accompanying drawing:

In the accompanying drawing annexed hereto and forming a part of this specification, I have shown the invention embodied in a gage for a standard pipe thread of medium size but it will be understood that the invention can be otherwise embodied and that the drawing is not to be construed as defining or limiting the scope of the invention, the claims appended to this specification being relied upon for that purpose.

In the drawing:

Figure 1 is a plan view of a complete gage made in accordance with the present invention.

Fig. 2 is a central longitudinal sectional view taken upon the plane of line 2—2 in Fig. 1.

Fig. 3 is a central sectional view through one of the grooved rolls, portions of which engage the flanks of the screw threads being gaged.

Fig. 4 is a view similar to Fig. 3 of one of the plain conical rolls adapted to engage the crests or outside diameter of the threads being gaged, and Fig. 5 is a fragmentary sectional view showing a portion of the gage indicating means taken on an axial plane at right angles to the plane of Fig. 2.

In the above mentioned drawing there has been shown but one embodiment of the invention which is now deemed preferable, but it is to be understood that changes and modifications may be made within the scope of the appended claims without departing from the spirit of the invention.

Briefly, and in its preferred aspect, the invention may include the following principal parts: First, a body member; second, a group of three grooved rolls adapted to engage and center a work piece being gaged supported against axial movement in and equally spaced from the central axis of the body member, and preferably free to rotate upon their axes; third, a group of three plain conical members grouped about the same axis as the grooved rolls and supported upon a member movable axially along the axis of the work piece being gaged; fourth, an abutment member adapted to engage the end wall of the threaded member being gaged when in gaging position; and fifth, indicating means to determine the position of the abutment member and the member carrying the plain conical rollers relative to each other and to the body member when the members are in their gaging positions.

Referring more in detail to the figures of the drawing, it will be seen that the body member 10 of the gage comprises a head on which there are three spaced bosses 12 and a projection 14 having a central axial hole extending therethrough. To this body member 10 an annular member 16 may be suitably secured, if desired, to enclose the gaging members mounted on the body member. This member 16, however, forms no part in the gaging mechanism and is used for the purpose of protecting the gaging member from rough handling. On the upper surfaces of the bosses 12 are equally spaced pins 18 upon which are rotatably mounted grooved rolls 20 similar in every way to rolls shown in the C. G. Johnson patent referred to above. These rolls 20 are fixed against axial movement and one or more of them may be adjustable a slight distance toward and from the central axis of the body member to accommodate screw threads of slightly varying size. As these rolls and their adjustment are or may be similar in every way to those shown in the above-mentioned patent to C. G. Johnson, it is not thought that further description of them will be necessary. When a threaded member (not shown) is disposed in gaging position within these rolls 20 it will be centered by the rolls and its axis will extend centrally of the projection 14 formed on the body member 10. The rolls 20, when the work piece being gaged is in its gaging position, simultaneously engage different spaced points along the helicoidal surfaces of the screw threads and retain the work piece centered and with its axis parallel to their own axes.

Slidably mounted within the central opening extending through the body member 10 and extension 12 is a sleeve member 22 having a flange at one end, the upper surface of which is carefully surfaced so that it extends in a plane normal to its axis of movement. On this slidable member 22 are disposed three conical rolls 24, the outer surfaces of which are conical and ungrooved and preferably these rolls may be mounted on pins 25 and may rotate in a manner similar to those shown in the S. G. Johnson patent referred to above. In gaging position these rolls 24 engage the truncated portions of the screw threads at the crests of the threads. This sleeve member 22 is normally held in an extreme position axially by a compression spring 26 shown in Fig. 2 and its axial movements are limited by a cross pin 28 extending transversely through the projection 14 on the body member and through a centrally disposed transverse slot in this slidable member. A bearing member 23 for the member 22 to slide within may be pressed within the opening within the projection 14.

Slidable relative to the sleeve member 22 carrying the conical members 24 and movable coaxially with this sleeve member is an abutment member 30 against one face of which the forward or smaller end of a threaded member being gaged is in contact when in its gaging position. This slidable member 30 is held in one axial position by a light spring 32 and its axial movement is limited by the cross pin 28 which extends through a central elongated transverse slot through this member.

With the member being gaged rotated into its gaging position within the space and enclosed by the three spaced grooved rolls 20, its end face will engage and depress the central abutment member 30 to a position dependent upon the diameter of the threaded portions of the member being gaged. Also this positioning of the work piece being gaged will depress the slidable member 22 carrying the conical rolls 24 while their conical surfaces engage the outside diameters or crests of the threads of the member being gaged. The axial position of the abutment member 30 relative to the body member 10 will indicate the diameter of the threaded surfaces of the work piece being gaged. The axial position of the sleeve member 22 relative to the abutment member 30 will indicate the amount of truncation or flattening at the crests of the threads.

A reference line 34 is provided adjacent the end of the abutment member 30 and a portion at the end may be milled off to provide an end wall. On the end surface of the sleeve member 22 carrying the conical rolls 24 a portion may be milled off to indicate the relative axial position of this member relative to the axial position of the abutment member 30. Preferably these members may be slabbed off at several different spaced points so that the positions of the member 22 carrying the plain rolls 24 and that of the abutment member 30 relative to the body member 10 and to each other may be determined by observing the relative positions of these end surfaces.

When a work piece is in gaging position the axial position of the member 30 relative to the base 10 on which the screw thread engaging rolls 20 are mounted indicates the size at the pitch diameters of the screw threads being gaged. The axial position of the sleeve 22 on which the conical rolls 24 are mounted indicates the size at the outside diameters of the screw threads being gaged. The relative axial positions of sleeve 22 and member 30 indicate the amount of truncation of the screw threads being gaged. This relative position of the sleeve 22 and member 30 is indicated by the position of reference line 34 relative to the cut-away portion at the outer end of the sleeve 22.

What I claim is:

1. A screw thread gage comprising in combination, a body member having annularly grooved rotatable gaging members adapted to engage the thread surfaces of the member being gaged, said members rotating when the member being gaged is being placed in gaging position, means to indicate the position of the member being gaged relative to said body member axially thereof when in its gaging position, supplemental gaging means engaging the outer surface of the threaded member being gaged, a member supporting said supplemental gaging means for movement parallelly with the axis of the member being gaged, and means to indicate the position of said member supporting said supplemental gaging means when in its gaging position relative to said body member.

2. A screw thread gage comprising in combination, a body member having three spaced rotatable gaging members adapted for simultaneous engagement with the threads of the member being gaged, means to indicate the position of the member being gaged relative to said body member axially thereof when in its gaging position, supplemental rotatable gaging members engaging other surfaces of the threaded member being gaged, a member supporting said supplemental gaging members for movement co-axially of said member being gaged, and means to indicate the axial position of said supplemental gaging members relative to said body member when in gaging position.

3. A screw thread gage comprising in combination, a body member having three spaced grooved rolls adapted for simultaneous engagement with the threaded surfaces of the member being gaged, means to indicate the position of the member being gaged relative to said body member axially thereof when in its gaging position, supplemental conical rolls simultaneously engaging the outer surfaces of the threaded member being gaged, a member supporting said supplemental rolls for movement co-axially relative to the member being gaged, and means to indicate the axial position of said member supporting said supplemental rolls relative to said body member when in gaging position.

4. A screw thread gage comprising in combination, a body member having three equally spaced grooved rolls adapted for simultaneous engagement with the threaded surfaces of the member being gaged, means to indicate the position of the end face of the member being gaged relative to said body member axially thereof when in its gaging position, supplemental gaging rolls simultaneously engaging the outer surface of the threaded member being gaged, a member supporting said supplemental gaging members for movement co-axially of the member being gaged, and means to indicate the relative positions of said member supporting said supplemental gaging members when in gaging position relative to the work piece being gaged.

5. A screw thread gage comprising in combination, a body member having three spaced gaging members adapted for simultaneous engagement with the threads of the member being gaged, an axially movable member engaging the end face of the member being gaged to indicate the position of the member being gaged relative to the body member axially thereof when in gaging position, supplemental gaging members engaging the crests of the screw threads of the member being gaged, a member supporting said supplemental gaging members mounted for movement coaxially of the member being gaged, and means to indicate the relative axial positions of the member supporting the supplemental gaging members and the member engaging the end face of the member being gaged.

GORDON E. CHILDS.

REFERENCES CITED

The following references are of record in the file of this patent:

UNITED STATES PATENTS

| Number | Name | Date |
| --- | --- | --- |
| 1,610,909 | Wetmore | Dec. 14, 1926 |
| 1,706,513 | Baines et al. | Mar. 26, 1929 |
| 1,908,253 | Johnson | May 9, 1933 |
| 2,218,111 | Johnson | Oct. 15, 1940 |
| 2,239,699 | Husband | Jan. 18, 1944 |